(12) United States Patent  
Saltini

(10) Patent No.: US 7,886,656 B2  
(45) Date of Patent: Feb. 15, 2011

(54) TWO-CHAMBERED AUTOMATIC PASTA-COOKER

(75) Inventor: Paolo Saltini, London (GB)

(73) Assignee: Priminelmondo Ltd., London (GB)

( * ) Notice: Subject to any disclaimer, the term of this patent is extended or adjusted under 35 U.S.C. 154(b) by 701 days.

(21) Appl. No.: 11/870,186

(22) Filed: Oct. 10, 2007

(65) Prior Publication Data

US 2009/0090247 A1    Apr. 9, 2009

(30) Foreign Application Priority Data

Oct. 4, 2007   (IT)   .......................... MI2007A1916

(51) Int. Cl.  
*A47J 27/14*   (2006.01)

(52) U.S. Cl. .............................. 99/331; 99/352; 99/355; 99/403; 99/407

(58) Field of Classification Search .................... 99/403, 99/407, 352, 355, 330, 331  
See application file for complete search history.

(56) References Cited

U.S. PATENT DOCUMENTS

| | | | | |
|---|---|---|---|---|
| 3,827,344 A | * | 8/1974 | Pratolongo | ................... 99/352 |
| 4,543,878 A | * | 10/1985 | Luchetti | ...................... 99/330 |
| 4,869,160 A | * | 9/1989 | Pratolongo | ................... 99/330 |
| 5,142,966 A | * | 9/1992 | Morandi et al. | ................ 99/352 |
| 5,191,829 A | * | 3/1993 | Caffarella | ..................... 99/352 |
| 5,361,682 A | * | 11/1994 | Crolla | .......................... 99/352 |
| 6,663,907 B1 | * | 12/2003 | Pratolongo | .................. 426/509 |

* cited by examiner

*Primary Examiner*—Reginald L Alexander  
(74) *Attorney, Agent, or Firm*—Lucas & Mercanti, LLP

(57) ABSTRACT

The present invention relates to an automatic pasta-cooker comprising a cooking chamber (1) and a stabilization chamber (2) for the pasta. Said cooking chamber (1) is provided with a feeding valve (3) and a discharge valve (5) for the pasta through which it is connected with a junction pipe (6) that opens into said stabilization chamber (2). Said pasta-cooker also comprises a boiler (7) suitable for heating mains water to be supplied to said cooking chamber (1). The stabilization chamber (2) is provided with an openable bottom and of at least one portion whose lateral wall has a curvature of constant sign. Said junction pipe (6) opens into the stabilization chamber (2) eccentrically with respect to a central axis of the stabilization chamber (2).

10 Claims, 3 Drawing Sheets

TWO-CHAMBERED AUTOMATIC PASTA-COOKER

BACKGROUND OF THE INVENTION

The present invention relates to an automatic pasta-cooker allowing rapid and programmed preparation of portions of pasta and similar food.

It is known that in restaurants, spaghetti-houses and similar public commercial concerns there is a need to rapidly prepare a high number of pasta dishes in order to serve a high number of customers in a time as short as possible.

Automatic apparatuses for cooking pasta are already known. For example, patent EP 1401310 describes an automatic pasta-cooker comprising two cooking chambers, the first chamber being provided with a valve for feeding raw pasta and an underlying valve for discharging cooked pasta and the second cooking chamber being arranged under said discharge valve of the first chamber and being provided at the bottom with a shutter for discharging the cooked pasta. Each chamber is also provided with a vent valve for discharging vapor, and is connected with a pipe for feeding hot water provided by a boiler, with a piping for draining cooking water and with a piping for draining vapor. Said pipes terminate into a heat exchanger for pre-heating the mains water before feeding it to the boiler.

A drawback of said known apparatus consists in that, during the partial cooking carried out in the first chamber, the pasta can stick together thus forming lumps that do not break up even in the second chamber wherein a larger quantity of water is contained. For this reason, it may happen that the final product served to the client is not completely satisfactory for the presence in the dish of lumps of stuck pasta.

U.S. Pat. No. 5,361,682 describes an apparatus for the quick cooking of pasta with hot water at high pressure, comprising two cooking chambers which are substantially arranged side by side and are connected by means of a substantially horizontal junction pipe. The apparatus also comprises a boiler suitable for supplying the two chambers with hot water and a heat exchanger suitable for pre-heating water to be supplied to the boiler.

This apparatus also has the disadvantage that it does not comprise means for breaking-up the lumps of pasta, which unavoidably sticks at least partially together during the cooking in the first chamber. As a matter of fact it is known that, in order to save energy and to guarantee the best uniformity of cooking, it is important that the geometry of the first chamber is such that the pasta is tightly contained inside said chamber. However said condition favors the undesired effect of the pasta sticking.

SUMMARY OF THE INVENTION

It is therefore an object of the present invention to provide an automatic pasta-cooker which is free from said disadvantages. Said object is achieved with an automatic pasta-cooker whose main features are disclosed herein.

A first advantage of the automatic pasta-cooker according to the present invention consists in that, thanks to the particular shape of the cooking and stabilization chambers, and to the arrangement of the junction pipe which connects them, the pasta served in the dish is free of lumps and is perfectly cooked.

BRIEF DESCRIPTION OF THE DRAWINGS

Further advantages and features of the according to the present invention will become clear to those skilled in the art from the following detailed and non-limiting description of an embodiment thereof with reference to the attached drawings, wherein.

DETAILED DESCRIPTION OF THE INVENTION

Figure 1:
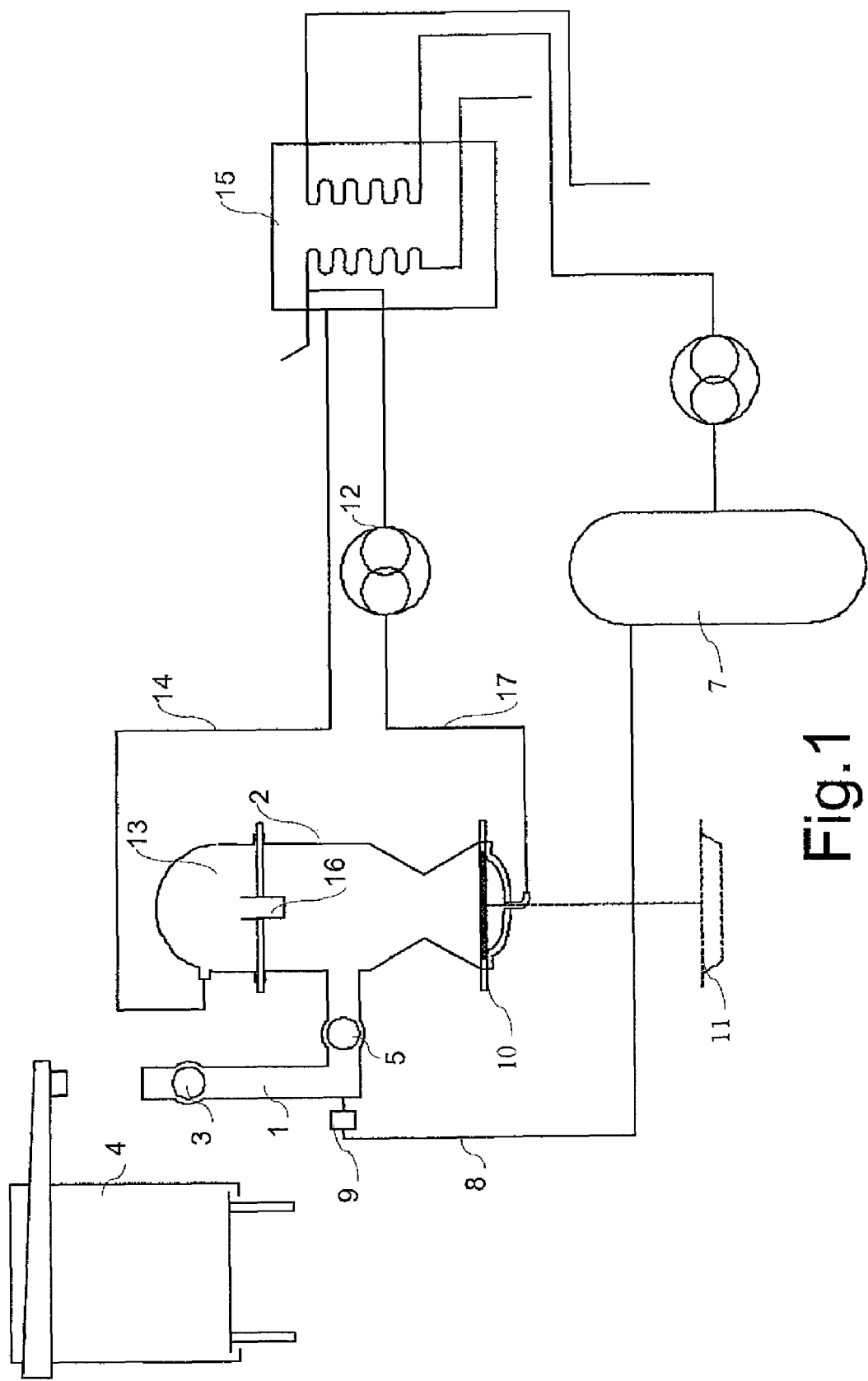
FIG. 1 shows a schematic side view of an automatic pasta-cooker according to an embodiment of the present invention.
Figure 2:
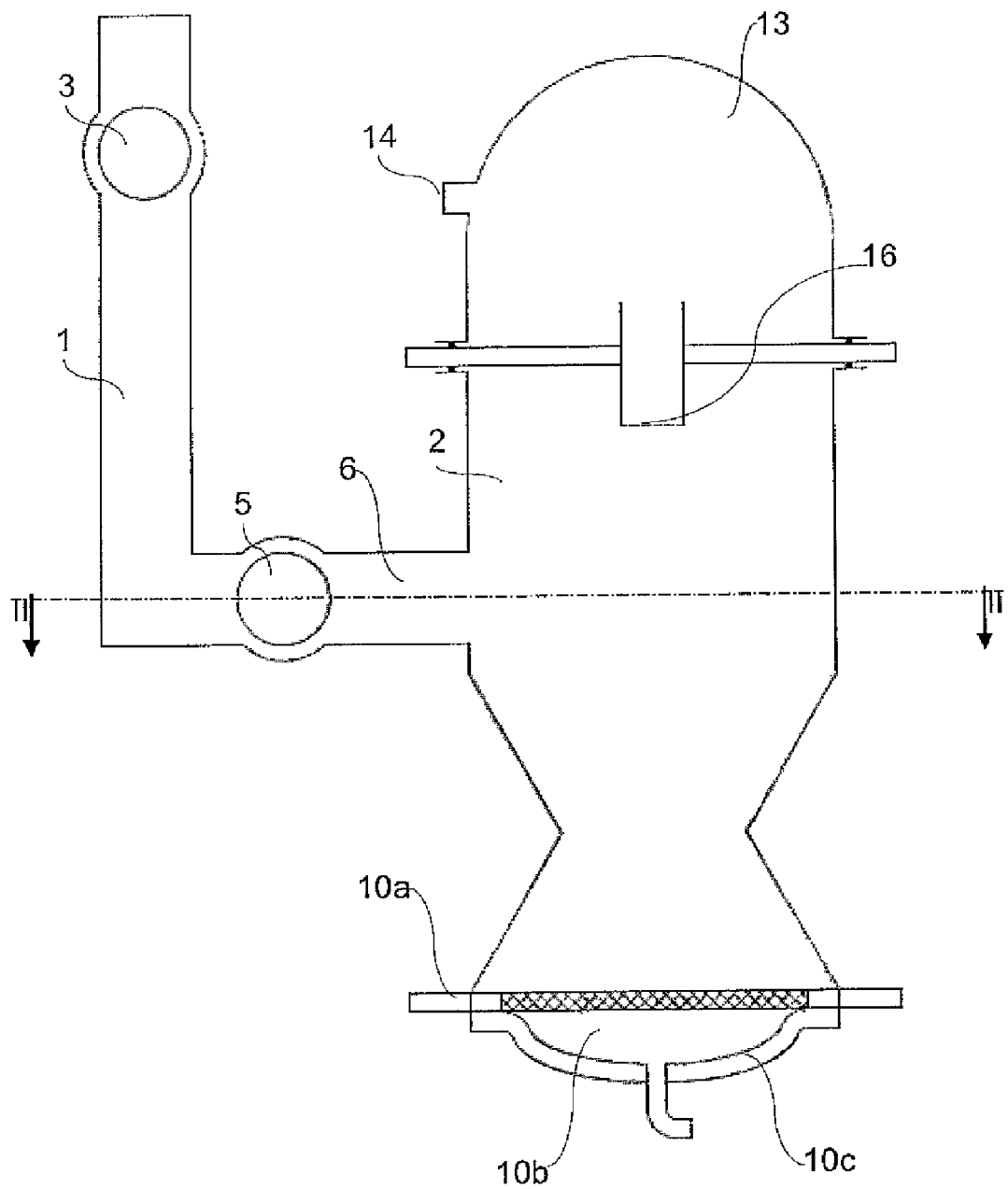
FIG. 2 is a schematic view of the cooking chamber and of the stabilization chamber of the pasta-cooker of FIG. 1.

With reference to the figures, there is shown that the pasta-cooker according to the present invention comprises a cooking chamber 1 for the raw pasta and a stabilization chamber 2 for finalizing the cooking, which are arranged substantially side by side. Cooking chamber 1 can be upstream connected, through a feeding valve 3, with a measuring device 4 for feeding raw pasta. For example said measuring device may be of the type described in the above mentioned patent EP1401310. Cooking chamber 1 is then connected downstream, by means of a discharge valve 5, with a junction pipe 6 which opens into said stabilization chamber 2 for the pasta.

Valves 3 and 5 are preferably pneumatic opening sphere valves, their opening and closing movements being controlled by means of a suitable software. In particular, discharge valve 5 opens after a prefixed time when the pasta contained in cooking chamber 1 reaches the programmed degree of initial cooking, thus allowing the pasta to pass into junction pipe 6.

Preferably, cooking chamber 6 is L-shaped, being formed of a first tubular segment arranged with a vertical axis and a second tubular segment having the same diameter of the first, arranged with horizontal axis, at the lower end of the first segment.

A boiler 7 supplies hot water to the cooking chamber 1 through a pipe 8 which has its outlet at the base of said chamber. For this purpose, said pipe is provided with an inflow valve 9. The shape of the chamber and the position of the outlet of pipe 8 improve the transfer of pasta into stabilization chamber 2, particularly in the case of long pasta, such as spaghetti. As a matter of fact, the lower ends of the spaghetti, initially arranged vertically in the first tubular segment of the chamber, are immediately softened by the water being introduced into the chamber and bend over, thus sliding into the horizontal segment of the cooking chamber. In this way, the pasta is prepared in the best way for being transferred into stabilization chamber 2.

According to the invention, the boiler is set in such a way that it heats water up to a temperature of about 120° C., which can be reached at the mains water pressure. Cooking chamber 1 is thus supplied with water having a mains pressure of about 3-4 atmospheres and a temperature of about 120° C.

Cooking chamber 1 and stabilization chamber 2 are thermostated, being preferably externally covered with bend heaters which enable the temperature of the chamber walls to be maintained constant and at prefixed values, even in case that they are in a stand-by condition. Particularly, the wall of cooking chamber 1 is maintained at about 100° C., whereas that of the stabilization chamber 2 is maintained at about 90° C. Thanks to the presence of said heaters, the water introduced into the chambers does not undergo undesired temperature falls and a control system is not necessary. Consequently, in the preferred embodiment of the invention chambers 1 and 2 of the pasta-cooker are not provided with vent valves which are necessary with apparatuses according to the state of the art.

Stabilization chamber 2 is provided with an openable bottom and comprises at least one portion whose lateral wall has a curvature of constant sign. In the present description and in the claims, a wall having a curvature with constant sign indicates a wall that, seen from the inside of the stabilization chamber 2, is concave for the whole extension thereof. For example, the cross-section of said wall can be of circular, oval or elliptical shape. Preferably, said lateral wall of the above-mentioned portion of the stabilization chamber is cylindrical.

In a preferred embodiment of the invention, said portion with cylindrical wall forms an upper portion of the chamber, whereas a lower portion of the chamber has an hour-glass shape, wherein hour-glass shape indicates the shape resulting from the union of two truncated cones joined at their lower base. Preferably in the lower truncated cone, which forms the base of the stabilization chamber 2, the lateral wall has an inclination of at least 30° with respect to the vertical.

Said junction pipe 6 opens into said portion of the stabilization chamber 2 having wall with curvature of constant sign.

Figure 3:
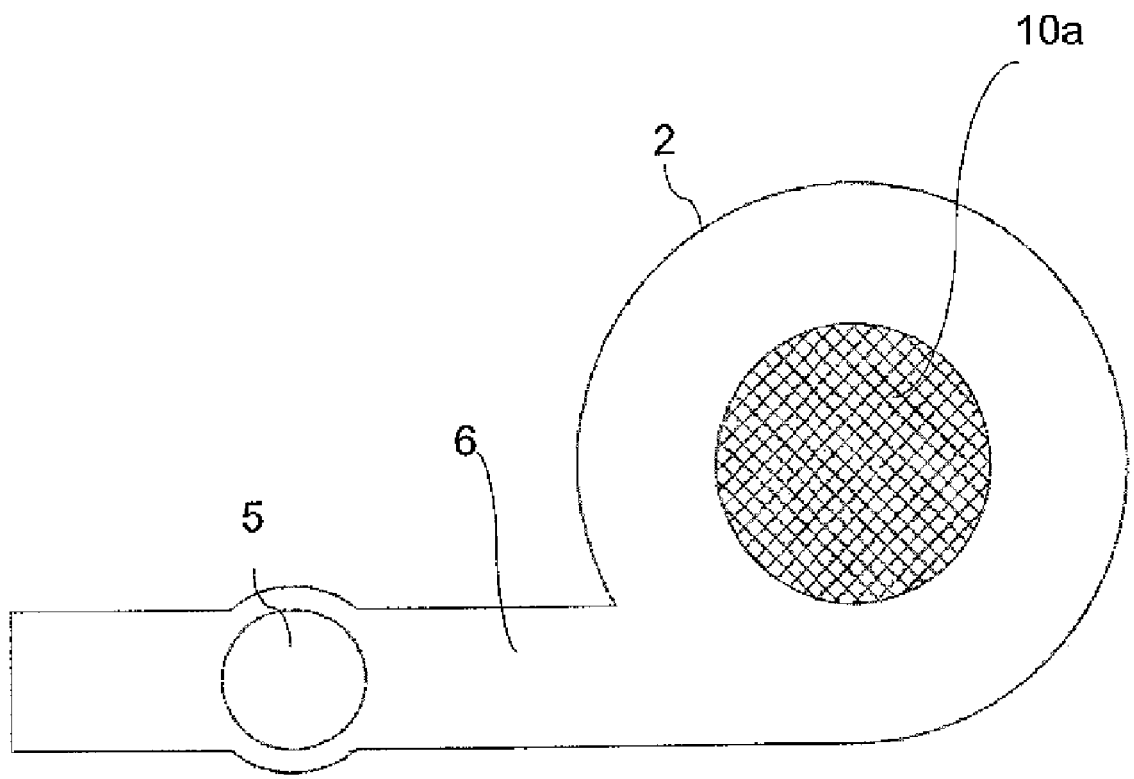
FIG. 3 shows a view in cross-section according to line II-II of FIG. 2.

With particular reference to FIG. 3, there is shown that junction pipe 6 opens into stabilization chamber 2 eccentrically with respect to a central axis of said stabilization chamber. This feature permits the elimination of possible pasta lumps which could have been formed during the cooking in chamber 1. As a matter of fact the possibly stuck or partially stuck pasta during the cooking in chamber 1, is introduced in the empty stabilization chamber 2 at a high velocity, being accelerated thanks to the pressure of about 3-4 atmospheres which, as previously mentioned, is present in chamber 1. Thanks to the eccentricity of junction pipe 6 with respect to the cylindrical wall of stabilization chamber 2, the pasta rotates at a very high speed inside chamber 2, by sliding along said lateral wall having a curvature of constant sign, and surprisingly said rotation results in the breaking-up of the lumps of pasta, which ends up on the bottom of the chamber in a nest arrangement in which it terminates the cooking in a non tumultuous way.

Preferably, junction pipe 6 is substantially arranged on a tangent plane to the surface having curvature of constant sign of chamber 2. In the case of cylindrical wall, said junction pipe 6 opens into the stabilization chamber 2 tangentially with respect to said cylindrical wall of the chamber.

Preferably, the axis of the junction pipe 6, at least in the final segment that opens into chamber 2, is substantially orthogonal with respect to the central axis of said stabilization chamber 2.

Also the particular shape of stabilization chamber 2, with a lower portion having the above described shape of an hour-glass, is designed in order to favor the breaking-up of the pasta lumps in the rotating pasta while descending towards the bottom of the chamber.

Besides the function of carrying out the pasta lumps breaking-up, the stabilization chamber also has the purpose of stabilizing the pasta cooking as well as that of a temporary container for the pasta which has to be served.

The openable bottom of the stabilization chamber 2 is preferably provided with a guillotine shutter 10, through which the cooked pasta is dropped into a dish 11, positioned underneath it in order to be served to the client. The shutter is provided with a gasket that guarantees a water-tight sealing of the stabilization chamber 2. Said guillotine shutter 10 comprises a perforated plate 10a and a plate 10c which enclose a compartment 10b. Plate 10c is provided with a concavity that, closed by means of plate 10a, forms that compartment 10b. The plates are integrally slidable, parallely to said bottom of chamber 2, for example by means of a mechanism with pneumatic pistons. Perforated plate 10a allows the passage of cooking water of the pasta into compartment 10b which is connected to a suction pump 12.

Said pump allows a predetermined quantity of cooking water to be drawn away. Once the desired quantity of water has been drawn away, the shutter opens and the drained pasta falls on dish 1. The small quantity of water that still adheres to the pasta discharged from chamber 2 ensures that the cooked pasta is adequately wet during the sauce addition.

Over cooking chamber 2 there is positioned expansion chamber 13 inside which the vapor produced by the cooking water is collected in order to be conveyed, through a suitable pipe 14, to a heat exchanger 15. Expansion chamber 13 communicates with stabilization chamber 2 by means of a vapor-permeable perforated septum 16.

Also the cooking water discharged from stabilization chamber 2 is sent to exchanger 15 by means of pump 12, through a pipe 17.

Expansion chamber 13 preferably has a double volume with respect to that of stabilization chamber 2. Preferably, it is separated from stabilization chamber by means of a plate provided with two O-rings which guarantee a perfect sealing of the expansion chamber 13 and of stabilization chamber 2. The plate has a central opening whereto a tube segment bearing at the lower end thereof a fine grid.

Heat exchanger 15 provided in the pasta-cooker according to the present invention allows most of the heat contained in the cooking water and in the vapor, respectively coming from cooking chamber 2 and from expansion chamber 11, to be recovered. For this purpose the heat exchanger, whereto hot water from pipe 14 and from pipe 17 is conveyed, bring in thermal contact the water flowing in these pipes with the mains water which is fed to boiler 7 through pipe 18 by means of pump 19. The heat exchanger 15 is also provided with a pipe 20 which is intended for the final discharge of the cooking water.

The invention claimed is:

1. Automatic pasta-cooker, comprising:
a cooking chamber for pasta;
a stabilization chamber for said pasta;
an expansion chamber of vapor; and
a boiler,
said cooking chamber having a feeding valve and a discharge valve through which said cooking chamber is connected to a junction device that opens into said stabilization chamber,
said stabilization chamber having an openable bottom and at least one portion with a lateral wall which has a curvature of a constant sign,
said expansion chamber being arranged above said stabilization chamber and communicating with said stabilization chamber through a vapor-permeable septum, and
said boiler being suitable for heating water to be supplied to said cooking chamber,
wherein said junction pipe opens into said stabilization chamber eccentrically with respect to a central axis of said stabilization chamber,
wherein said stabilization chamber is connected to a pipe for discharging said water which terminates in a heat exchanger suitable for preheating water before supplying said water to said boiler, and
wherein said expansion chamber is connected to a pipe for discharging the vapor which terminates in said heat exchanger.

2. Automatic pasta-cooker according to claim 1, wherein said lateral wall is cylindrical.

3. Automatic pasta-cooker according to claim 2, wherein said junction pipe opens into said stabilization chamber tangentially with respect to said cylindrical wall.

4. Automatic pasta-cooker according to claim 2, wherein said junction pipe has a substantially orthogonal axis with respect to an axis of said portion having a cylindrical wall of the stabilization chamber.

5. Automatic pasta-cooker according to claim 2, wherein said stabilization chamber comprises said portion having a cylindrical wall and an underlying portion having shape of two truncated cones joined through a lower base thereof.

6. Automatic pasta-cooker according to claim 1, wherein said cooking chamber has tubular shape and is substantially L-shaped in vertical section.

7. Automatic pasta-cooker according to claim 1, wherein said openable bottom of said stabilization chamber is provided with a guillotine shutter which comprises a perforated plate and a plate, which are integral and slidable parallely to said bottom of said stabilization chamber, said plates enclosing a compartment connected to a suction pump and to a discharge pipe for the water.

8. Automatic pasta-cooker according to claim 3, wherein said junction pipe has a substantially orthogonal axis with respect to an axis of said portion having a cylindrical wall of the stabilization chamber.

9. Automatic pasta-cooker according to claim 3, wherein said stabilization chamber comprises said portion having a cylindrical wall and an underlying portion having shape of two truncated cones joined through a lower base thereof.

10. Automatic pasta-cooker according to claim 4, wherein said stabilization chamber comprises said portion having a cylindrical wall and an underlying portion having shape of two truncated cones joined through a lower base thereof.

* * * * *